Aug. 2, 1955
A. T. WUPPERMANN
2,714,669
NON-CONTACTING THICKNESS GAUGE
Filed Aug. 16, 1951
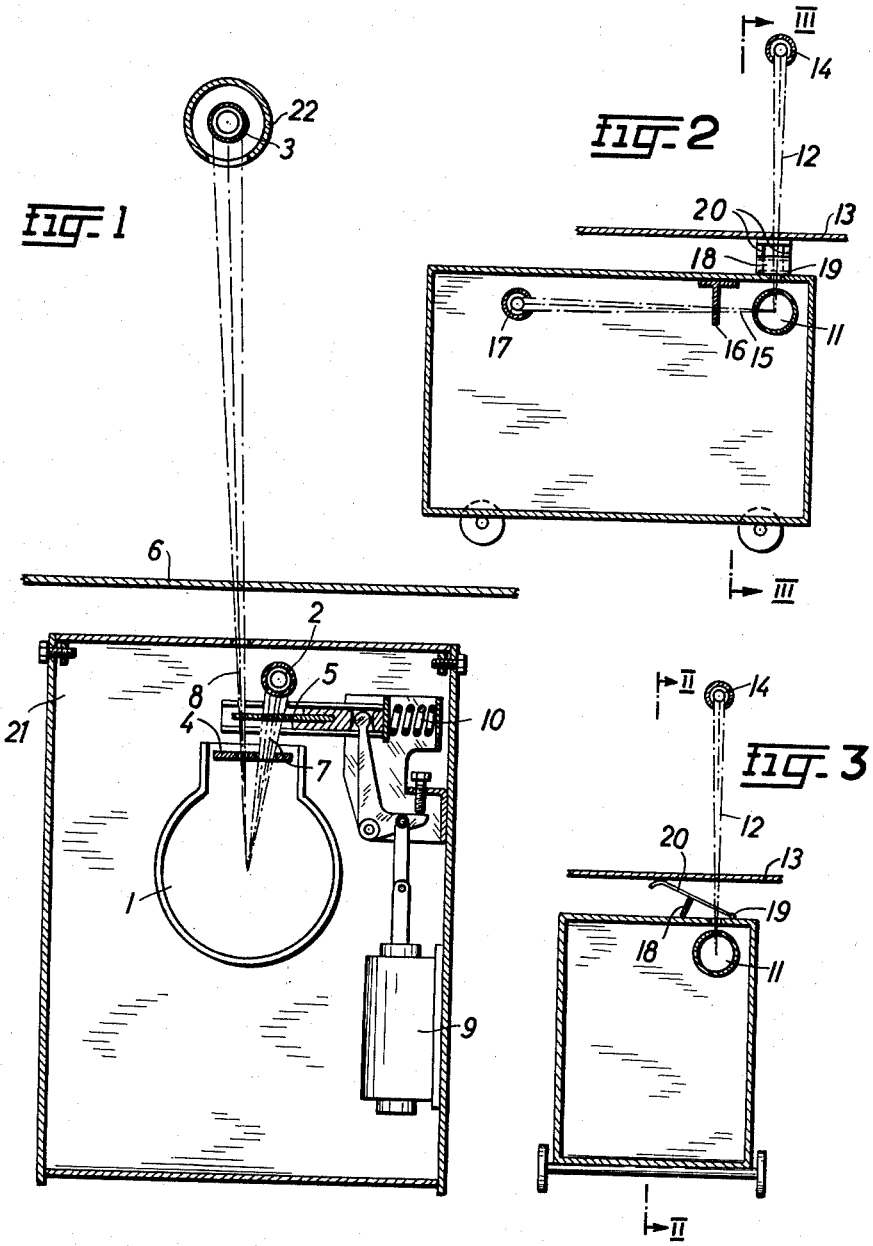
INVENTOR.
A. T. Wuppermann
BY
Bryant & Lowry
Attys.

United States Patent Office 2,714,669
Patented Aug. 2, 1955

2,714,669

NON-CONTACTING THICKNESS GAUGE

August Theodor Wuppermann, Leverkusen-Schlebusch, Germany, assignor to Exatest Gesellschaft fur Mebtechnik mit beschrankter Haftung, Leverkusen, Germany, a firm Application August 16, 1951, Serial No. 242,104

4 Claims. (Cl. 250—83.6)

This invention relates to a method and means for measuring the thickness of band material without touching it, especially for continuously measuring the thickness of moving rolled bands, in particular hot rolled products.

The measurement of moving material without touching it has already been tried by various methods. For example, there has been known an apparatus for measuring the thickness of sheet metal in which gamma or beta rays emitted from radium or a radioactive isotope of strontium radiate through the sheet metal to be measured in order to be registered by means of a counting tube or the like at the other side. In that case, the absorption of rays or the scattered radiation forms the criterion of the measurement. Moreover, it has been known to measure the thickness of products, without touching them, by means of X-ray tubes. In one case, there have been used two X-ray tubes one of which irradiates the piece to be measured and the other one irradiates a comparison piece. For the purpose of indication, there are employed fluorescent screens the light of which is received by photoelectric cathodes of two electron multipliers. The reliability of such a measuring apparatus depends on the condition that the X-ray tubes have to be tuned in and adapted to one another, whereby the apparatus as a whole is very complicated.

It has also been proposed to use one X-ray tube only and to measure the intensity of the radiation penetrating the product to be measured by means of an ionisation chamber or the like. The thickness of the product to be measured is directly determined as a function of the intensity according to the known exponential law. In another case, the intensity of two similar X-ray beams of the same radiating source are compared with one another, whereby one X-ray beam penetrates the rolled band to be measured and the other one penetrates a piece of desired thickness and equal material. The beams of rays are intercepted by a fluorescent screen the luminous intensity of which is measured by comparing it with a standard source of light by means of a photometer. That is an indirect method by comparison inasmuch the beam of rays to be led through the product to be measured is simultaneously sent through another measuring wedge too. Such a measuring system requires a complicated apparatus for evaluating and adjusting.

A main object of the instant invention resides in the provision of an improved means for measuring the thickness of band products without touching them, in which suitable rays are used for simplifying and facilitating the measuring system and arrangement.

Another essential object of the invention is to provide a measuring means of said kind, wherein the path of rays extends directly, avoidable sources of interference are eliminated, and the adjacent device for evaluating the alterations of the intensity of radiation can be based upon more vigorous influences.

A further object of the invention is to provide a measuring means of said kind, in which on one path the rays of the radiating source are directly sent through the product to be measured only and on the other path only through a gage, for instance a measuring plate, to a measuring receiver, for instance a counting tube of the Geiger-Müller type, and the differences of intensity at those measuring tubes constitute the basis for the indication of tolerance of thickness.

It will be appreciated that the device according to the invention is simplified and more reliable in operation since the measuring method using direct comparison enables a robust construction. The sensitivity of the device as well as the accuracy are considerably increased.

In order to influence the measuring tubes always equally, independent of whether or not the product to be measured passes the measuring device, in accordance with the invention the measuring plate projects into the path of rays of the beam generally associated with the product to be measured as soon as the product moves out of this beam of rays, for example, if the rolling operation has been finished. Any energy source of radiation which is adapted for measuring purposes may serve as the source of radiation, for example an X-ray tube, a radioactive source of radiation emitting gamma or beta rays or another equivalent radiating energy.

According to the invention an arrangement of the measuring apparatus is preferred in which on the one hand the measuring plate generally remains in the path of rays of the comparing receivers and, on the other hand, is enabled to come into the range of the other path of rays so as to form the substitute for the possibly absent product to be measured. This characteristic is advantageous inasmuch as the two measuring detectors or receivers, such as Geiger-Müller counting tubes, are generally influenced in an equal manner, apart from the path or position of the product to be measured, thus resulting in a higher measuring accuracy of the whole apparatus.

According to another feature of the invention the highest degree of accuracy can be obtained if the relations of distances of the product to be measured and the comparing gage, respectively, to the single source of radiation as well as between the measuring detectors or receivers and said single source of radiation are maintained equal or approximately equal. In particular, the rays passing both the product to be measured and the comparing gage are guided in such directions that the reciprocal interference of the measurement due to scattered or stray radiation (secondary radiation effects) will be negligible. This, for example, can be obtained by arranging the beams of rays in right angles one to another. Such a measuring system makes it easy to obtain equal relations of distances of the corresponding members. The comparing beam of rays, however, may have any direction if it is possible to keep its relations of distances approximately identical to that of the measuring beam of rays.

Even if stray radiation cannot be avoided entirely, due to the equal distances of the parts it is obtained that in case of any residual stray radiation of both the direct measuring beam and the comparing beam their effects with respect to the measuring detectors or receivers, for instance Geiger-Müller counting tubes, are equal. Both measuring paths are subjected to the same influence so that such an interference will not effect the result of the measurement owing to the differential evaluation of the two beams of rays.

For further increasing the measuring accuracy the condition of inertia of both the measuring receivers and the source of radiation is kept constant so as to have the necessary basis for a flawless and reliable evaluation of the differential readings. For that purpose, the cooling conditions of both the source of radiation, for instance an X-ray tube, and the counting tubes, are in conformity so as to assure a uniform heating of the source of radiation as well as of the counting tubes. This can be obtained, for instance, by supplying the cooling agent to said parts in a suitable manner.

While some of the more salient features, characteristics and advantages of the instant invention have been above pointed out, others will become apparent from the following disclosures, taken in conjunction with the accompanying drawings, in which Fig. 1 is a section of an embodiment of the invention and, besides, illustrates the mode of operation;

Fig. 2 shows a longitudinal section, taken on line 2—2 of Fig. 3, of another embodiment of the invention; and Fig. 3 shows a cross section of the same, taken on line 3—3 of Fig. 2.

Referring now more specifically to the drawings, in Fig. 1 there is shown an embodiment using an X-ray tube 1 and two measuring detectors or receivers 2, 3 preferably Geiger-Müller counting tubes, which are located in a carriage located perpendicular to the rolling direction and displaceable across the width of a rolled product 6. The radiation of the X-ray tube 1 is directed to the counting tubes 2, 3 through guide openings of a screening plate 4, for example such as a lead plate. A measuring plate 5 positioned between the counting tubes 2, 3 and the screening plate 4 and consisting of the material of the product to be measured has the desired thickness of said product so that in quiescent condition the counting tubes 2, 3 indicate equal intensity of radiation or can be controlled in such a manner. For this purpose, the measuring plate 5 is displaced by such an amount that beams of rays 7, 8 pass the measuring plate 5 in the same manner so long as the product 6 to be measured is not positioned in the range of the beam of rays 8. In the operating position, the measuring plate 5 is withdrawn by such an amount that the beam corresponding to the counting tube 3 does not penetrate the measuring plate 5, and its intensity is only influenced by the passage through the rolled product, whereas the intensity of the beam corresponding to the counting tube 2 is unchangedly determined by the thickness of the measuring plate 5. The reading of the difference of intensity between the measuring detectors or receivers 2, 3 indicates the deviation of thickness of the product to be measured from the desired thickness with respect to amount and direction. During the quiescent condition, the device is adjusted with respect to the desired thickness of the rolled product. The adjusting operation is convenient since both beams of rays pass the same measuring plate. For this purpose, the beams are closely positioned to one another so as to obtain substantially the same incident direction.

It is preferred to adjust the measuring plate 5 automatically, for example by withdrawing the plate 5 out of the beam of rays 8 by means of a relay and an electromagnet 9 when the rolled product enters the measuring device. When the end portion of the rolled product leaves the measuring device the measuring plate 5 will immediately be displaced into the range of the beam 8 by means of a spring 10. In this manner, a steady uniform admission is assured.

In the modified embodiment shown in Figs. 2 and 3 a beam of rays 12 emitted from a source of radiation radiates through a sheet 13 to be measured and is applied to a measuring detector or receiver 14, for example a Geiger-Müller counting tube. The beam of rays used for the comparing measurement is so positioned that a troublesome interference by diffusing rays or the like will not influence the beam of rays 12. In the embodiment, shown by way of example, the axis of a beam of rays 15 is positioned nearly at right angles with respect to the beam of rays 12. The beam of rays 15 passing a comparing gage 16 extends to a measuring detector or receiver 17. It is essential that the distances from both the product 13 to be measured and the comparing gage 16 to the source of radiation 11 are equal. Moreover, the distances from the measuring detectors or receivers 14, 17 to the source of radiation 11 and likewise from the parts 13 and 16 are to be kept equal. By maintaining these on appropriately equal distances it is obtained that residual stray radiations are equal as to their influence referring to the measuring receivers. When the product 13 to be measured has left the path of the beams another comparing gage or a calibrating plate 18 is moved into the path of beams between the source of radiation 11 and the measuring receiver 14. Said calibrating plate 18 moves to replace the product 13 to be measured in such a manner that the relations of distances remain equal. In this manner identical comparing conditions are obtained which are essential for a high accuracy of evaluation. The calibrating plate 18 if the product 13 is fed out, can be automatically brought into the path of beams in any manner, for instance in a mechanical way by the product 13 itself or, alternatively, in an electric way by means of a magnet or the like. When the product 13 enters the measuring device the calibrating plate 18 is likewise automatically withdrawn from the measuring beam. In Fig. 3 the device is illustrated by a lever 20 rotatable about a point 19. The lever 20 comes into contact with the product 13 if swivelled automatically forward.

The source of radiation and the measuring receivers are preferably located in housings 21, 22, respectively. These housings are kept under overpressure in a suitable manner so as to protect all sensible parts from any damages by penetrating of undesired substances, such as for instance iron oxide in hot rolling mills.

It will, of course, be understood that various details of construction and arrangement may be varied through a wide range without departing from the principles of this invention, and it is, therefore, not intended to limit the patent granted hereon otherwise than as necessitated by the scope of the appended claims.

What I claim is:

1. Electronic means for indicating variations from desired thickness of a moving strip of sheet material, said means including a source of radiant energy emitting a beam which passes only through the path of movement of the sheet material, an ionization indicator on the side of said path opposite said source, means for directing a second beam from said source in a second direction, a second ionization indicator for the second beam radiating from said source, a standard measuring plate having a thickness corresponding to the desired sheet material and of the same character, said standard plate being located across the paths of both beams, and being movable into and out of the path of said first beam instead of the sheet material to be measured, when this material is absent, both beams diverging from each other at an acute angle.

2. The invention according to claim 1, and means including a spring urging said standard plate into beam intersecting position with the first beam, and electromagnetic means for retracting said measuring plate from said intersecting position.

3. Electronic means for indicating variations from desired thickness of a moving strip of radiation-absorbing sheet material, said means including a source of radiant energy emitting a first beam in a direction which passes across the path of movement of the sheet material, an ionization indicator on the side of the path opposite said source, means for directing a second beam from said source in a second direction, a second ionization detector in the path of said second beam, a measuring plate having a uniform thickness corresponding to the desired sheet material and of the same radiation-absorbing character, means for selectively moving said plate into and out of the path of the first beam, and means for continuously absorbing from said second beam a fixed percentage of its radiation identical to the percentage absorbed by said plate from the first beam, whereby said plate may be placed in the first beam to provide a calibration comparison during intervals when none of such sheet material is in measuring position.

4. Apparatus in accordance with claim 3, in which said beams are directed at right angles to one another from said source, and in which the means for moving said plate into and out of the first beam is actuated by the sheet material.

References Cited in the file of this patent
UNITED STATES PATENTS

| | | |
|---|---|---|
| 2,467,812 | Clapp | Apr. 19, 1949 |
| 2,513,818 | Roop | July 4, 1950 |
| 2,537,914 | Roop | Jan. 9, 1951 |